United States Patent
Hodgins et al.

(10) Patent No.: US 9,389,598 B2
(45) Date of Patent: *Jul. 12, 2016

(54) SYSTEMS AND METHODS FOR TRACKING AND BALANCING ROBOTS FOR IMITATING MOTION CAPTURE DATA

(71) Applicant: Disney Enterprises, Inc., Burbank, CA (US)

(72) Inventors: Jessica K. Hodgins, Pittsburgh, PA (US); Katsu Yamane, Pittsburgh, PA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/314,609

(22) Filed: Jun. 25, 2014

(65) Prior Publication Data
US 2014/0309781 A1 Oct. 16, 2014

Related U.S. Application Data

(63) Continuation of application No. 12/730,657, filed on Mar. 24, 2010, now Pat. No. 8,781,624.

(60) Provisional application No. 61/162,838, filed on Mar. 24, 2009.

(51) Int. Cl.
*G06F 19/00* (2011.01)
*G05B 11/32* (2006.01)
*B62D 57/032* (2006.01)
*G05B 19/19* (2006.01)

(52) U.S. Cl.
CPC ............. *G05B 11/32* (2013.01); *B62D 57/032* (2013.01); *G05B 19/19* (2013.01); *Y10S 901/01* (2013.01)

(58) Field of Classification Search
USPC ......... 700/250, 245, 255, 246, 261, 258, 251, 700/253, 260, 180, 65.1, 65.51; 318/568.1, 318/568.12, 568.23; 901/1, 45, 46, 2, 19; 180/65.1
See application file for complete search history.

(56) References Cited

U.S. PATENT DOCUMENTS

| | | | | |
|---|---|---|---|---|
| 2004/0034449 | A1* | 2/2004 | Yokono et al. | 700/245 |
| 2007/0185618 | A1* | 8/2007 | Nagasaka | 700/245 |
| 2007/0255454 | A1* | 11/2007 | Dariush | 700/245 |
| 2009/0118863 | A1* | 5/2009 | Dariush | 700/255 |

* cited by examiner

*Primary Examiner* — Ronnie Mancho
(74) *Attorney, Agent, or Firm* — Ference & Associates LLC

(57) ABSTRACT

Various embodiments of the invention provide a control framework for robots such that a robot can use all joints simultaneously to track motion capture data and maintain balance. Embodiments of the invention provide a framework enabling complex reference movements to be automatically tracked, for example reference movements derived from a motion capture data system.

20 Claims, 14 Drawing Sheets

SYSTEMS AND METHODS FOR TRACKING AND BALANCING ROBOTS FOR IMITATING MOTION CAPTURE DATA

CROSS REFERENCE TO RELATED APPLICATIONS

This application is a continuation application of U.S. patent application Ser. No. 12/730,657, filed on Mar. 24, 2010 and entitled "SYSTEMS AND METHODS FOR TRACKING AND BALANCING ROBOTS FOR IMITATING MOTION CAPTURE DATA", which claims priority to U.S. Provisional Application Ser. No. 61/162,838, filed Mar. 24, 2009 and entitled "SIMULTANEOUS TRACKING AND BALANCING OF HUMANOID ROBOTS FOR IMITATING HUMAN MOTION", the content of each prior application is incorporated herein by reference as if set forth in its entirety.

BACKGROUND

Programming robots, especially to perform natural (for example, human-like) motions, is a difficult task. The motions are usually programmed manually or by numerical optimization techniques to minimize, for example, energy consumption subject to dynamics and/or kinematics constraints. Motion capture data is potentially a good starting point; however, previous uses of motion capture data have fallen short of tracking and balancing robots as contemplated herein.

BRIEF SUMMARY

Embodiments of the invention broadly include systems, methods, apparatuses and computer program products that provide a control framework for virtual or mechanical artificial agents (referred to herein as "robots", for example humanoid robots). The control framework uses reference motion data (such as motion capture data or animation data) and all joints simultaneously to track motion and maintain balance. A controller according to an embodiment of the invention comprises two main components: a balance controller and a tracking controller. In an embodiment of the invention, the balance controller uses a regulator designed for a simplified humanoid model to obtain the desired input to keep balance based on the current state of the robot. The simplified model is chosen so that a regulator can be designed systematically using, for example, optimal control. As an example, a linear quadratic regulator designed for an inverted pendulum model can be employed. The desired inputs are typically the center of pressure and/or torques of some representative joints. In an embodiment of the invention, the tracking controller then computes the joint torques that minimize the difference from desired inputs as well as the error from desired joint accelerations to track the motion capture data, considering full-body dynamics.

In summary, one aspect of the invention provides a mechanical artificial agent comprising: a plurality of moving parts being joined via a plurality of joints, the plurality of moving parts including upper and lower moving body parts; and a controller configured to control motion of the plurality of moving parts, the controller comprising: a balance controller configured to provide a balancing control signal; and a tracking controller configured to generate motion commands, the motion commands being configured to track input reference motion while maintaining balance in accordance with the balancing control signal; wherein each one of the plurality of joints is capable of utilizing the motion commands and contributing to tracking the reference motion and maintaining balance.

Another aspect of the invention provides a method comprising: receiving input data corresponding to reference motion; providing a balancing control signal to a tracking controller of a mechanical artificial agent having a plurality of moving parts joined via a plurality of joints, the plurality of moving parts including upper and lower moving body parts; providing a tracking control signal via the tracking controller, the tracking control signal comprising motion commands configured to track reference motion while maintaining balance in accordance with the balancing control signal; wherein each one of the plurality of joints is capable of utilizing the motion commands and contributing to tracking the reference motion and maintaining balance.

An apparatus comprising: one or more processors; and a program storage device having computer readable program code associated therewith configured to control motion of a mechanical artificial agent having a plurality of moving parts joined via a plurality of joints, the plurality of moving parts including upper and lower moving body parts, the computer readable program code being executable by the one or more processors and comprising: computer readable program code configured to provide a balancing control signal; and computer readable program code configured to generate motion commands, the motion commands being configured to track input reference motion while maintaining balance in accordance with the balancing control signal; wherein each one of the plurality of joints is capable of utilizing the motion commands and contributing to tracking the reference motion and maintaining balance.

Yet another aspect of the invention provides a computer program product comprising: a program storage device having computer readable program code associated therewith configured to control motion of a mechanical artificial agent having a plurality of moving parts joined via a plurality of joints, the plurality of moving parts including upper and lower moving body parts, the computer readable program code being executable by one or more processors and comprising: computer readable program code configured to provide a balancing control signal; and computer readable program code configured to generate motion commands, the motion commands being configured to track input reference motion while maintaining balance in accordance with the balancing control signal; wherein each one of the plurality of joints is capable of utilizing the motion commands and contributing to tracking the reference motion and maintaining balance.

For a better understanding of exemplary embodiments of the invention, together with other and further features and advantages thereof, reference is made to the following description, taken in conjunction with the accompanying figures, and the scope of the invention will be pointed out in the appended claims.

DETAILED DESCRIPTION

Figure 1:
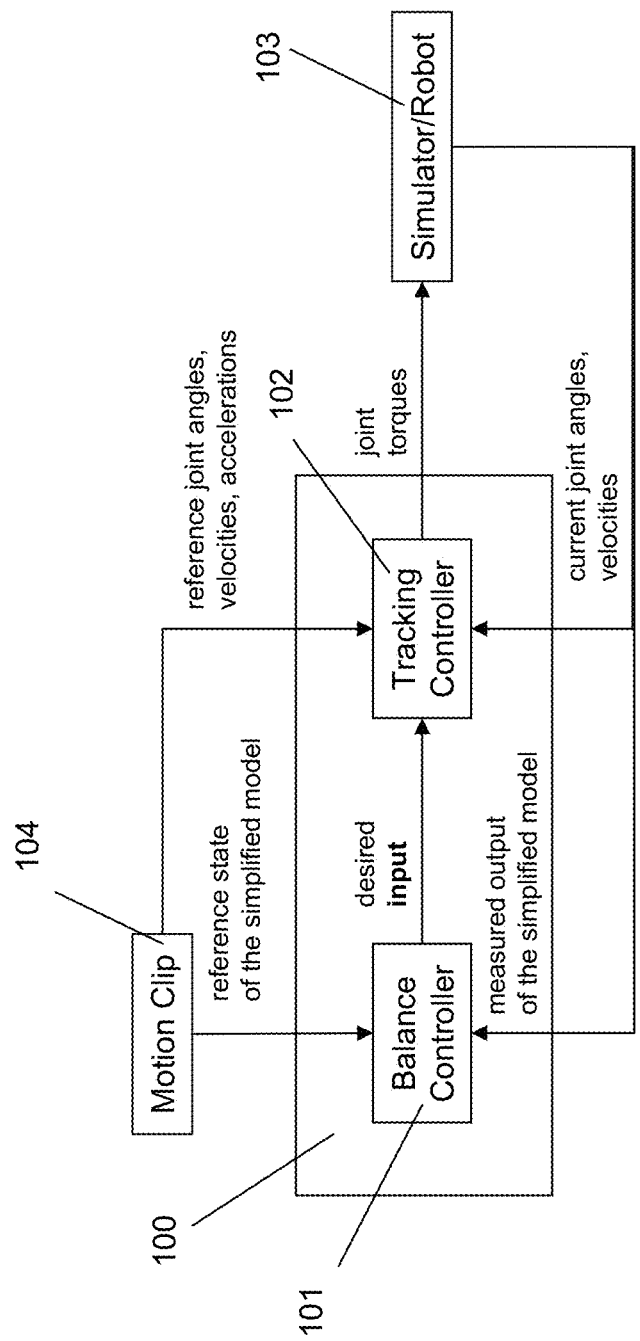
FIG. 1 illustrates a motion controller according to an embodiment of the invention.

It will be readily understood that the components of the embodiments of the invention, as generally described and illustrated in the figures herein, may be arranged and designed in a wide variety of different configurations in addition to the described embodiments. Thus, the following more detailed description of the embodiments of the invention, as represented in the figures, is not intended to limit the scope of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain exemplary embodiments of the invention.

Regarding the figures, the flowchart and/or block diagrams in the figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that while the description provided herein focuses on humanoid robots and human motion captured data, the invention, as claimed, is not so limited. Embodiments of the invention are equally applicable to other types of virtual or mechanical artificial agents, robots and/or sources of input data.

The inventors have recognized that programming humanoid robots, especially to perform natural, human-like motions, is a difficult task. The humanoid robots are usually programmed manually or by numerical optimization techniques to minimize, for example, energy consumption subject to dynamics and/or kinematics constraints. Although human motion capture data is potentially a good starting point, it is difficult to map captured data to humanoid robots because of differences in kinematics and dynamics parameters. In fact, most of the work in mapping human motion capture data to other humanoid models has been in the graphics field where full-body dynamics are not usually considered.

Most of the current successful humanoid robots are programmed by first determining a center of pressure (COP, also known as zero moment point) trajectory based on the footprint and generating a physically consistent center of gravity (COG) trajectory using a simplified dynamics model such as inverted pendulum, and then computing the inverse kinematics to obtain the joint angles that satisfy the planned COG trajectory and footprints. Some work also uses an inverted pendulum model for balancing. These frameworks have been successful because the reference motion is guaranteed to be physically consistent, but are not generally capable of tracking motion capture data because adding the reference joint trajectory on top of the planned trajectory might break the physical consistency.

Although applying human motion capture data to humanoid robots has been a growing area of research recently, few of these approaches successfully controlled real hardware with a floating base. Most work has focused on mapping human motion to humanoid robots with fewer degrees of freedom and categorizing human motion into different behaviors for humanoid motion synthesis. Prior work adapted captured upper body motions to humanoid robots considering the kinematic constraints such as joint angle and velocity limits. Converting motion capture data sequences to satisfy the full-body dynamics constraints of free-floating humanoids has been addressed in robotics as well as graphics, but these efforts have focused on planning and do not address the issue of recovering balance under disturbances.

In fact, very little work has successfully controlled humanoid hardware based on human motion capture data. One prior work realized robot-dancing motions by manually segmenting human motion data into different tasks and constructing a controller for each task. Another prior work proposed a method to generate physically consistent motion by optimizing COG trajectory based on an inverted pendulum model while respecting the reference joint trajectories during the inverse kinematics computation. However, both approaches required manual work for designing controllers or pre-processing captured data.

Some work has realized online tracking of upper-body motions during double support in full-body simulation and hardware. However, this work uses the lower body specifically for balancing and therefore is not fully capable of tracking leg motions that may conflict with the balancing task.

The description now turns to the figures and select embodiments of the invention. The following description of various embodiments of the invention is presented to highlight certain aspects of the invention, and the scope of the invention will be pointed out in the appended claims.

One or more embodiments of the invention provide a control framework for humanoid robots that uses all joints simultaneously to track motion capture data of a subject and maintain balance. Embodiments of the invention focus on tracking joint angle trajectories, although some tasks may require tracking other quantities such as end-effector trajectories. According to one embodiment of the invention, the controller works in double support, but the balancing task is distributed among all joints, including those in the upper body. In addition, the controller does not require segmentation or intensive pre-processing of motion capture data, which makes it applicable to real-time applications. Moreover, according to another embodiment of the invention, stepping and more complex motions are allowed.

According to an embodiment of the invention, the controller comprises two components: a balance controller and a tracking controller. The balance controller attempts to keep the whole body balanced by using a simplified model for which a robust balance controller can be easily designed. A typical non-limiting example is an inverted pendulum with linear quadratic regulator (LQR), which is used to describe non-limiting exemplary embodiments presented herein. The balance controller gives desired inputs to keep the simplified model balanced. Examples of such inputs include center of pressure (COP) and torques of representative joints.

According to embodiments of the invention, the tracking controller makes the joints follow the reference trajectory specified by the motion capture data while respecting the desired inputs given by the balance controller. Joint trajectory tracking is enabled by commanding desired joint accelerations based on joint angle and velocity errors, as well as feed-forward joint accelerations. The tracking controller then solves an optimization problem with a quadratic cost function, including errors from desired inputs and joint accelerations.

Herein demonstrated is the balancing and tracking ability of a controller with a full-body dynamics simulation that takes into account joint velocity and torque limits. After showing basic balancing capability, a non-limiting exemplary use case is provided wherein a controller according to an embodiment of the invention is applied to track motion capture clips of two subjects telling the same story. As shown herein, the resulting robot motions clearly preserve the original style of each subject. The robustness of embodiments of the invention is also demonstrated by perturbing the inertial parameters of the simulation model. Thereafter, the addition of stepping and complex motions is described.

Controller

FIG. 1 shows an overview of a controller 100 according to an embodiment of the invention. The two main components are a balance controller 101 and a tracking controller 102. The balance controller 101 is responsible for keeping the whole body balanced, for example by using a controller designed for a simplified dynamics model such as LQR for a linear inverted pendulum model. The output of the balance controller 101 is the desired input to the simplified model such as center of pressure and/or torques of representative joints. The tracking controller 102 is responsible for making every joint track the desired trajectory. The tracking controller 102 solves an optimization problem that respects both joint tracking and desired inputs to the simplified model, and obtains the joint torques to be commanded to the robot 103.

Motion Capture Data Processing

For the purposes of this description, it is assumed the use of a commercial optical motion capture system to obtain the reference motion data (for example, a motion clip 104), which typically includes of a set of marker trajectories in the Cartesian space. The marker data are labeled and cleaned as in the normal motion capture pipeline. The data is then scaled to fit the particular robot (103) size and converted to joint angle data for the robot 103 by an inverse kinematics algorithm taking into account the joint motion range. Due to the joint limits and the difference between the kinematics of the subject and robot 103, the joint angle data usually have problems such as foot skating at points of contact.

For pre-processing, it is herein assumed for the present example that both feet are flat on the floor at the initial frame. The correct foot position and orientation were estimated by projecting those obtained using the raw marker data onto the floor. (An embodiment incorporating stepping and other complex motions will be described below). Then, the inverse kinematics for new foot locations were computed to obtain the cleaned joint angles and retain the difference from original joint angles. At each frame during control, the difference was added to the original data to obtain the cleaned reference joint angles. Although this correction is extremely simple, it permits a controller according to this exemplary embodiment of the invention to not require further cleanup.

Notations and Basic Equations $N_J$ denotes the number of actuated joints of the robot. The total degrees of freedom (DOF) of the robot is then $N_G=N_J+6$ including the 6 DOF of the translation and rotation of the root joint. The robot configuration is uniquely defined by the generalized coordinate $q \in \mathcal{R}^{N_G}$ whose first 6 components correspond to the root joint. The generalized force is denoted by $\mathcal{T}_G \in \mathcal{R}^{N_G}$.

Humanoid robots usually move with some of their links in contact with the environment. Let $N_C$ denote the number of links in contact. The linear and angular velocities of the i-th contact link is represented by a 6-dimensional vector $\dot{r}_{ci}$. The relationship between the generalized velocity $\dot{q}$ and $\dot{r}_{ci}$ is written as $$\dot{r}_{ci} = J_{ci}\dot{q} \quad (1)$$

where $J_{ci} \in \mathcal{R}^{6 \times N_G}$ is the Jacobian matrix of the of the i-th contact link's position and orientation with respect to the generalized coordinates. Differentiating equation (1), the relationship of the accelerations obtained is:

$$\ddot{r}_{ci} = J_{ci}\ddot{q} + \dot{J}_{ci}\dot{q}. \quad (2)$$

The compound contact Jacobian matrix $J_c$ is defined by:

$$J_c \begin{pmatrix} J_{c1} \\ J_{c2} \\ \vdots \\ J_{cN_C} \end{pmatrix} \in \mathcal{R}^{6N_C \times N_G}. \quad (3)$$

Because the root joint is not actuated, only the joint torque vector $\tau_J \in \mathcal{R}^{N_J}$ can be controlled. In addition, each of the $N_C$ links in contact with the environment receives contact force $f_{ci}$ and moment around the link local frame $n_{ci}$ ($i=1, 2, \ldots, N_C$). The compound contact force/moment vector is defined by $f_c = (f_{c1}^T n_{c1}^T \ldots f_{cN_C}^T n_{cN_C}^T)^T \in \mathcal{R}^{6N_C}$.

The equation of motion of the robot is written as $$M\ddot{q}+c=N^T\tau_j+J_c^T f_c \quad (4)$$

where $M \in \Re^{N_G \times N_G}$ is the joint-space inertia matrix and $c \in \Re^{N_G}$ is the sum of Coriolis, centrifugal and gravity forces. Matrix $N \in \Re^{N_j \times N_G}$ is used to map the joint torques into the generalized forces and has the form $$N=(0_{N_j\times 6} 1_{N_j\times N_j}) \quad (5)$$

where $0_*$ and $1_*$ are zero and identity matrices of the sizes indicated by their subscripts, respectively.

Balance Controller

Figure 2:
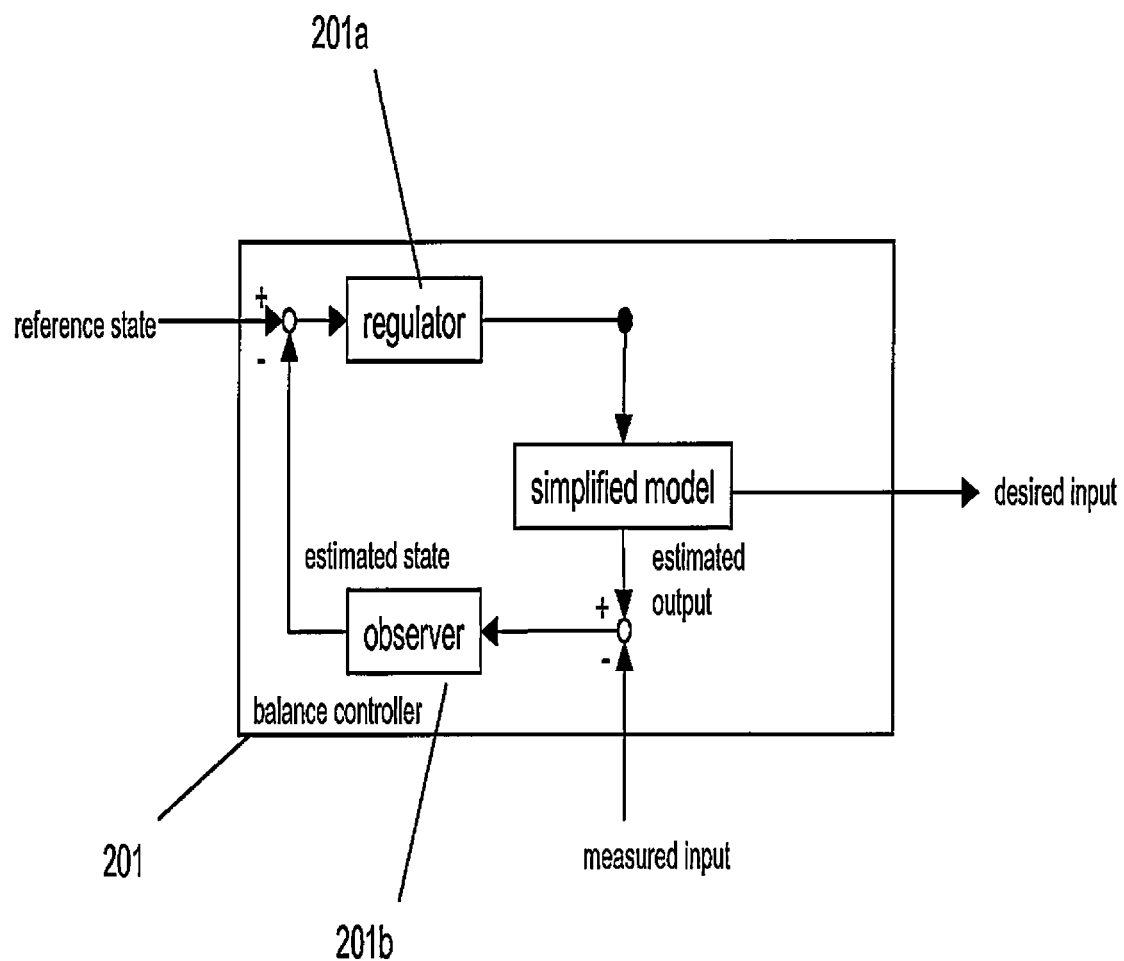
FIG. 2 illustrates a balance controller according to an embodiment of the invention.

FIG. 2 shows the structure of a balance controller 201 according to an embodiment of the invention. The balance controller 201 consists of two main components: a regulator 201a configured to compute the input to the simplified model to keep balance and an observer 201b configured to estimate the current state based on measurements. Any simplified model can be used as long as it represents the dynamics (of, for example, a humanoid robot) and a balance controller 201 can be designed. A typical example is a linear inverted pendulum, for which a regulator 201a can be easily designed by pole placement or optimal control.

In order to provide some detail regarding estimating the current state of the simplified model based on a reference state and measured input, a non-limiting example is as follows. Assume that the simplified model is linear and represented by state-space differential equation:

$$\dot{x}=Ax+Bu \quad (6)$$

$$y=Cx \quad (7)$$

where x is the state, u is the input, and y is the output of the simplified model. Also assume that a state feedback controller for balancing has been designed:

$$u=K(x_{ref}-x) \quad (8)$$

where K is a constant gain matrix and $x_{ref}$ is a reference state, typically computed from the reference motion.

The observer 201b compares the estimated and actual outputs to update the state estimate $\hat{x}$ as:

$$\dot{\hat{x}}=A\hat{x}+Bu+F(\hat{y}-y) \quad (9)$$

where F is the observer gain and $\hat{y}=C\hat{x}$ is the estimated output. Because the real state cannot be accessed, the state x is replaced by its estimate $\hat{x}$ in equation (8):

$$u=K(x_{ref}-\hat{x}) \quad (10)$$

Using equations (6), (7), (9) and (10), the following system of the estimated state and new input $u_b=(x_{ref}^T y^T)^T$ is obtained:

$$\dot{\hat{x}}=A_b\hat{x}+B_b u_b \quad (11)$$

where $$A_b=A-BK-FC$$

$$B_b=(B -F).$$

Equation (11) describes how to estimate the current state of the simplified model based on a reference state and measured output. The estimated state and input to the simplified model computed by equation (10) can be used as the input to a tracking controller 102.

Inverted Pendulum Example

Figure 3:
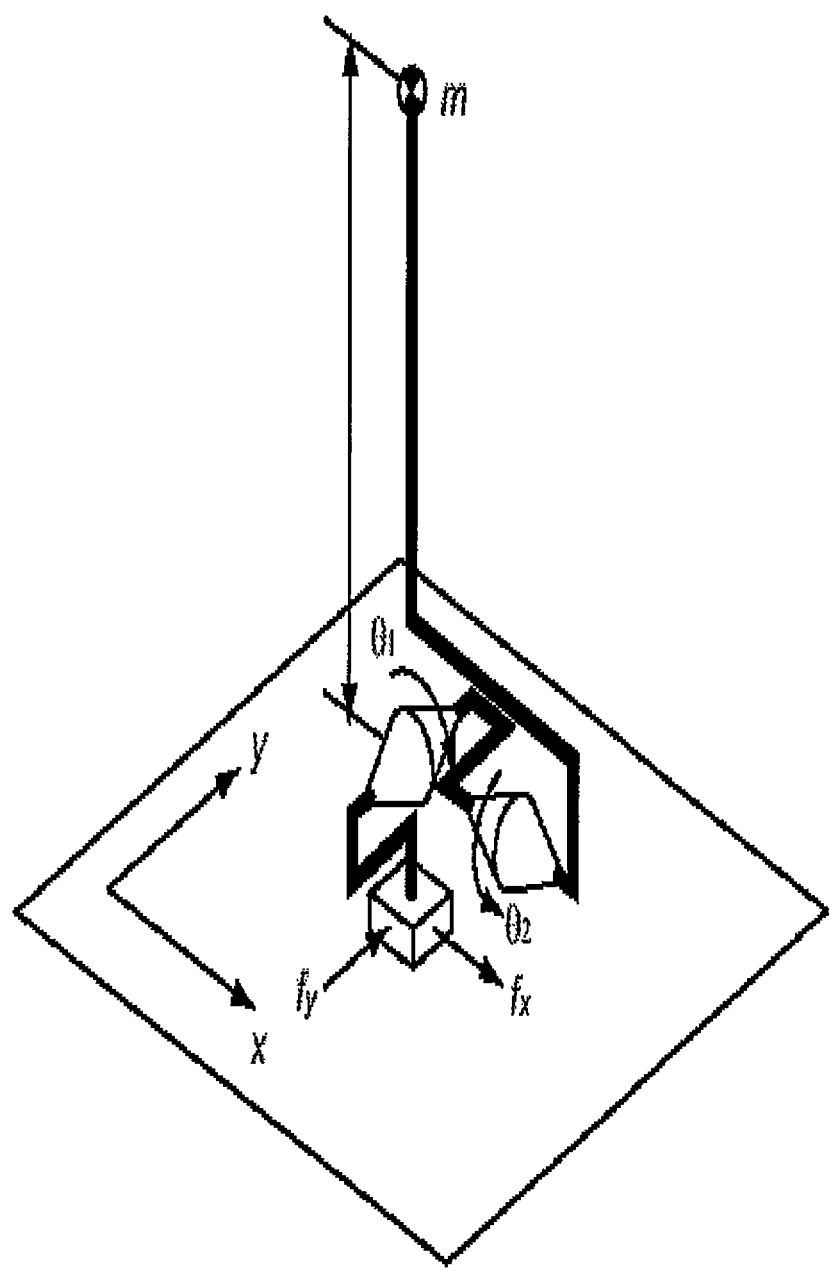
FIG. 3 illustrates an inverted pendulum model for a balance controller according to an embodiment of the invention.

Herein is presented an example of a balance controller (such as balance controller 201 illustrated in FIG. 2) using a linear inverted pendulum as the simplified model. Referring to FIG. 3, illustrated are two active linear joints whose position and actuator force are represented by (x, y) and ($f_x$, $f_y$), respectively, two unactuated joints whose joint angles are $\theta_1$ and $\theta_2$, and a point mass m. The location of the linear joints and the point mass correspond to the COP and COM of the full body model, respectively. After linearization, the pendulum can be treated as two independent planar pendulums with joints (x, $\theta_1$) and (y, $\theta_2$). Therefore, the pendulum with (x, $\theta_1$) is used as an illustrating example.

The state is defined with input and output vectors of the linear inverted pendulum as follows:

$$x=(x\theta_1\dot{x}\dot{\theta}_1)^T \quad (12)$$

$$u=f_x \quad (13)$$

$$y=(Xl\theta_1)^T. \quad (14)$$

Note that the x coordinate of the point mass is used as output instead of $\theta_1$. Although $f_x$ is the actual input to the inverted pendulum, there is no corresponding input in the whole-body model. Instead, x is used, which denotes where the COP of the whole-body model should be, as the desired input. Other possible forms of desired input include torques of representative joints if the simplified model contains active rotational joints such as in double inverted pendulum.

The reference state of this inverted pendulum mode is $x_{ref}^T = (x_{rc} 0 0 0)^T$ where $x_{rc}$ is the x coordinate of the COM position computed from the reference joint angles. The measured output y consists of the x coordinates of the actual COP and COM positions.

Then, a regulator is designed for the inverted pendulum. Here, LQR is applied, which determines the state feedback gain K such that the following cost function is minimized:

$$J=\int_0^\infty (x^T Qx+u^T Ru)dt \quad (15)$$

where $Q \geq 0$ and $R>0$ are symmetric weight matrices. The weight matrices can be easily determined by observing the response to disturbances. For example, the weights can be determined so that the desired COP does not go out of the contact area when the maximum possible external force is applied.

Tracking Controller

Figure 4:
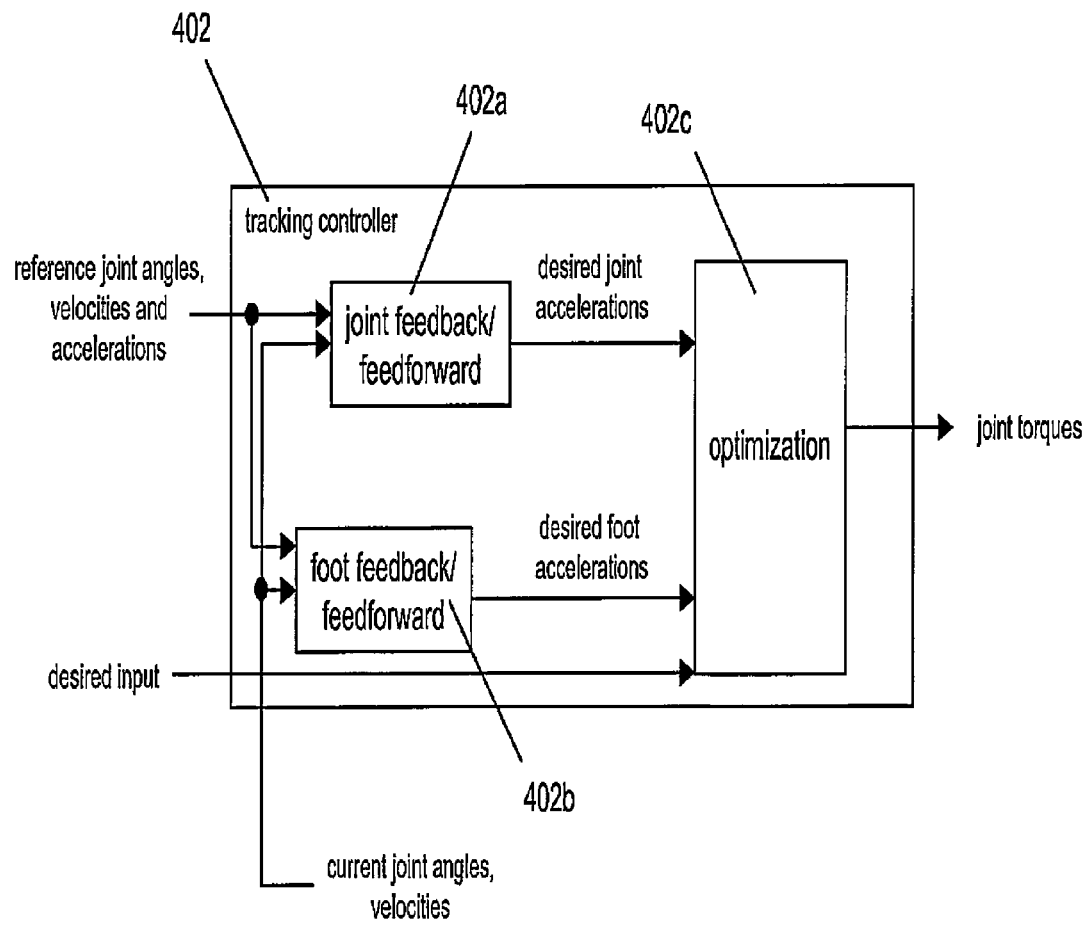
FIG. 4 illustrates a tracking controller according to an embodiment of the invention.

FIG. 4 shows the structure of a tracking controller 402 according to an embodiment of the invention. The tracking controller 402 consists of two local controllers 402a, 402b and a joint torque optimization module 402c.

Local Controllers

According to embodiments of the invention, the local controllers 402a, 402b compute the desired accelerations of joint and contact links based on the reference and current position and velocity, as well as the reference accelerations. In the joint controller 402a, the desired acceleration $\dot{\bar{q}}$ is computed as follows at each joint:

$$\dot{\bar{q}}=\ddot{q}_{ref}+k_d(\dot{q}_{ref}-\dot{q})+k_p(q_{ref}-q) \quad (16)$$

where q is the current joint position, $q_{ref}$ is the reference joint position in the captured data, and $k_p$ and $k_d$ are constant position and velocity gains that may be different for each joint.

It can be assumed that the position and orientation of the root joint is available either by accelerometer and gyro sensors or by computing the kinematics assuming that at least one of the feet is flat on the ground. The desired linear and angular accelerations of the root joint can therefore be computed, and combined with all desired joint accelerations to form the desired acceleration vector $\dot{\bar{q}} \in \Re^{N_G}$. Control law (16) is the same as the one used in resolved acceleration control, except that the root joint is not actuated and the desired acceleration may be altered by the optimization part (as described further herein). In order to keep the feet from slipping, and potentially to realize the desired contact state, also computed is the desired feet accelerations $\ddot{r}_C \in \Re^{6N_C}$ using the same control law.

Optimizer

The task of the optimizer 402c is to compute the control inputs based on the information obtained so far: $\ddot{q}, \ddot{r}_c$ and the desired input to the simplified model obtained by the balance controller 402. In most cases, however, these conditions conflict with each other. Therefore, an optimization is performed to compute a set of joint torques that respects all of these quantities.

The unknowns of the optimization are the joint torques $\tau_J$ and contact forces $f_c$. The cost function to be minimized is:

$$Z = Z_s + Z_q + Z_c + Z_\tau + Z_f \quad (17)$$

and each of the five terms will be described in detail in the following paragraphs.

The term $Z_s$ addresses the error from the desired input to the simplified model. Because the mapping from the simplified model to the full-body model can be in any form, here are considered two examples of such a mapping: center of pressure (COP) and torque of a representative joint. Cost function $Z_s$ then becomes the sum of the errors associated with these quantities, that is:

$$Z_S = e_{COP} + e_\tau. \quad (18)$$

First consider the case where the desired input includes the desired location of the COP $r_p = (r_{px}\ r_{py}\ 0)^T$. The COP error is represented as $$e_{COP} = \frac{1}{2} f_c^T P^T W_P P f_c \quad (19)$$

where P is the matrix that maps $f_c$ to the resultant moment around the desired COP and can be computed as follows: first obtain the matrix $T \in \Re^{6 \times 6N_C}$ that covers the individual contact forces to total contact force and moment around the world origin by:

$$T = (T_1\ T_2\ \ldots\ T_{NC}) \quad (20)$$

and $$T_i = \begin{pmatrix} 1_{3\times3} & 0_{3\times3} \\ [p_{ci} \times] & 1_{3\times3} \end{pmatrix} \quad (21)$$

where $p_{ci}$ is the position of the i-th contact link and $[a\times]$ is the cross product matrix of a 3-dimensional vector a. The total force/moment is then converted to resultant moment around COP by multiplying the following matrix:

$$C = \begin{pmatrix} 0 & 0 & r_{py} & 1 & 0 & 0 \\ 0 & 0 & -r_{px} & 0 & 1 & 0 \end{pmatrix} \quad (22)$$

which leads to P=CT.

The case where desired input includes torques of $N_r$ representative joints, $\hat{\tau}_r \in \Re^{N_r}$ is trivial. Let $R \in \Re^{N_r \times N_C}$ be the matrix to extract the torques of representative joints from $\tau T_J$. The error can be written as:

$$e_\tau = \frac{1}{2}(\hat{\tau}_r - R\tau_J)^T W_r (\hat{\tau}_r - R\tau_J). \quad (23)$$

The term $Z_q$ denotes the error from the desired joint accelerations, that is:

$$Z_q = \frac{1}{2}(\hat{\ddot{q}} - \ddot{q})^T W_q (\hat{\ddot{q}} - \ddot{q}). \quad (24)$$

The term $Z_c$ denotes the error from the desired contact link accelerations, that is:

$$Z_c = \frac{1}{2}(\hat{\ddot{r}}_c - \ddot{r}_c)^T W_c (\hat{\ddot{r}}_c - \ddot{r}_c). \quad (25)$$

The term $Z_\tau$ is written as:

$$Z_\tau = \frac{1}{2}(\hat{\tau}_J - \tau_J)^T W_\tau (\hat{\tau}_J - \tau_J) \quad (26)$$

where $\hat{\tau}_J$ is a reference to joint torque, which is typically set to a zero vector and hence $Z_\tau$ acts as a damping term for the joint torque.

The term $Z_f$ has a similar role for the contact force, that is:

$$Z_f = \frac{1}{2}(\hat{f}_c - f_c)^T W_\tau (\hat{f}_c - f_c) \quad (27)$$

where $\hat{f}_c$ is a reference contact force, which is also typically set to the zero vector.

Using equations (2) and (4), the cost function can be converted to the following quadratic form:

$$Z = \frac{1}{2} y^T A y + y^T b + c \quad (28)$$

where $y = (\tau_J^T - f_c^T)^T$ is the unknown vector.

The optimization problem has an analytical solution:

$$y = -A^{-1} b \quad (29)$$

Considering Contact Force and Hardware Limits

It has been so far assumed that any contact force is available. In reality, however, frictions and moments around x and y axes have limitations. Real hardware also has limitations in joint angles, velocities and torques. Inequality constraints could be added to enforce these constraints, but solving the optimization problem would take significantly longer than simply using equation (29).

These limitations are dealt with according to embodiments of the invention by adjusting the parameters in the optimization instead of adding constraints, hence without changing the solution (29). In the event that the limitations are not always met, the expectation is that the balance controller can compensate for the difference between approximate and exact solutions.

For the contact force limitations, larger values for elements of $W_f$ are set corresponding to the frictions and moments. To address the joint torque limit, the reference joint torque used in equation (26) is utilized. If any of the joint torques exceeds its limit at a sampling time, the corresponding reference torque is set to the limit in the next sampling time and increases the weight. Therefore, it can be expected that the excess torque would be relatively small and thus have little effect, even if the torque is saturated by the limit.

Simulation Results

To evaluate certain embodiments of the invention, a dynamics simulator with rigid-body contact model was used for simulations, the precision of which has been demonstrated in some simulation settings. A humanoid robot was used for the simulations. The robot had 34 joints in total (excluding hands and eye pan/tilt) and 25 of the joints (fixed neck and wrist DOFs) were used for the evaluations described herein as non-limiting examples of performance of various embodiments of the invention.

The joint kinematics and inertial parameters were derived from the CAD model. Experimentally verified joint motion range and joint torque limit information was used as well as the design specification for the joint velocity limit. The joint motion range constraint was enforced during the inverse kinematics computation, but the joint motion range was not considered in simulation (it was assumed that the joints track the reference trajectory well enough). If a joint velocity came close to the limit, a strong damping torque was added to reduce the speed. If the optimized joint torque exceeded the limit, it was reset to the maximum value before the simulator computed the joint acceleration.

The weights for LQR cost function (15) were:

$$Q = \text{diag}\{1.0 \times 10^7 \, 1.0 \times 10^8 \, 1.0 \times 10^2 \, 1.0 \times 10^3\}$$

$$R = 1.0$$

which were chosen so that COP did not go out of the contact area for a large impact. The observer gains were chosen so that the estimated state converged sufficiently fast compared to the poles of the closed loop. The feedback gains for the joint and contact link tracking were $k_p = 4.0$ and $k_d = 4.0$, except where otherwise noted. All weights for the cost function were chosen to be diagonal with all elements being 1 except for $W_\tau$ and $W_c$. The diagonal elements of $W_\tau$ were set to 0 by default and, if a joint torque exceeded the limit, the corresponding value was changed to 1. The diagonal elements of $W_c$ were set to $1.0 \times 10^{-9}$ and $1 \times 10^{-7}$ for vertical forces and other forces, respectively.

Simple Balancing with Inverted Pendulum Model

Herein it is first demonstrated a basic function of a balance controller 201 by using a fixed posture as reference. A robot was hit by a 250 N force at the neck joint from t=1 to 1.1 s, while trying to keep the initial posture. As a reference, a slightly different version of the controller 100 was used where the balance controller was replaced by a simple COM position controller that computes the desired COM acceleration to bring it back to the original position with the same feedback/feedforward controller (16) and the same gains. The optimizer 402c then attempts to the desired COM acceleration instead of desired COP position. The two controllers shared the same joint and contact link tracking controllers.

Figure 6:
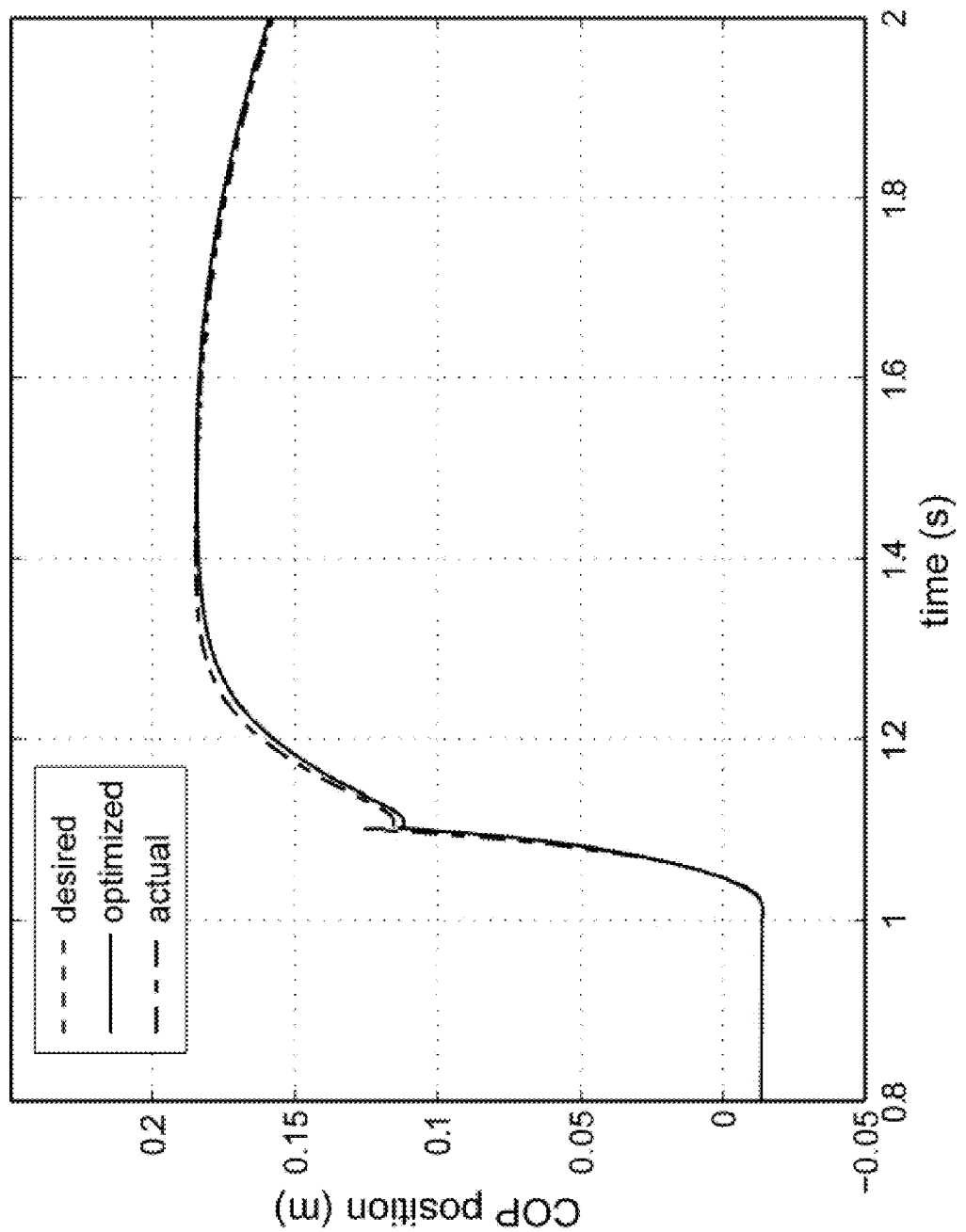
FIG. 6 illustrates center of pressure (COP) in the front direction during simple balancing with a controller according to an embodiment of the invention.

FIG. 6 shows the COM position in the forward direction of a robot resulting from two controllers. A controller according to an embodiment of the invention successfully brought the robot back to the original posture. The COM controller version, on the other hand, stopped the COM even earlier than the controller according to an embodiment of the invention, but the robot eventually fell backwards. The reason is that, although the COM controller version can stop the COM motion, that action comes at the cost of moving the upper body forward rapidly, and compensation for the upper body recovery motion cannot be obtained. This error potentially can be fixed by tuning the joint and COM feedback gains.

Figure 5:
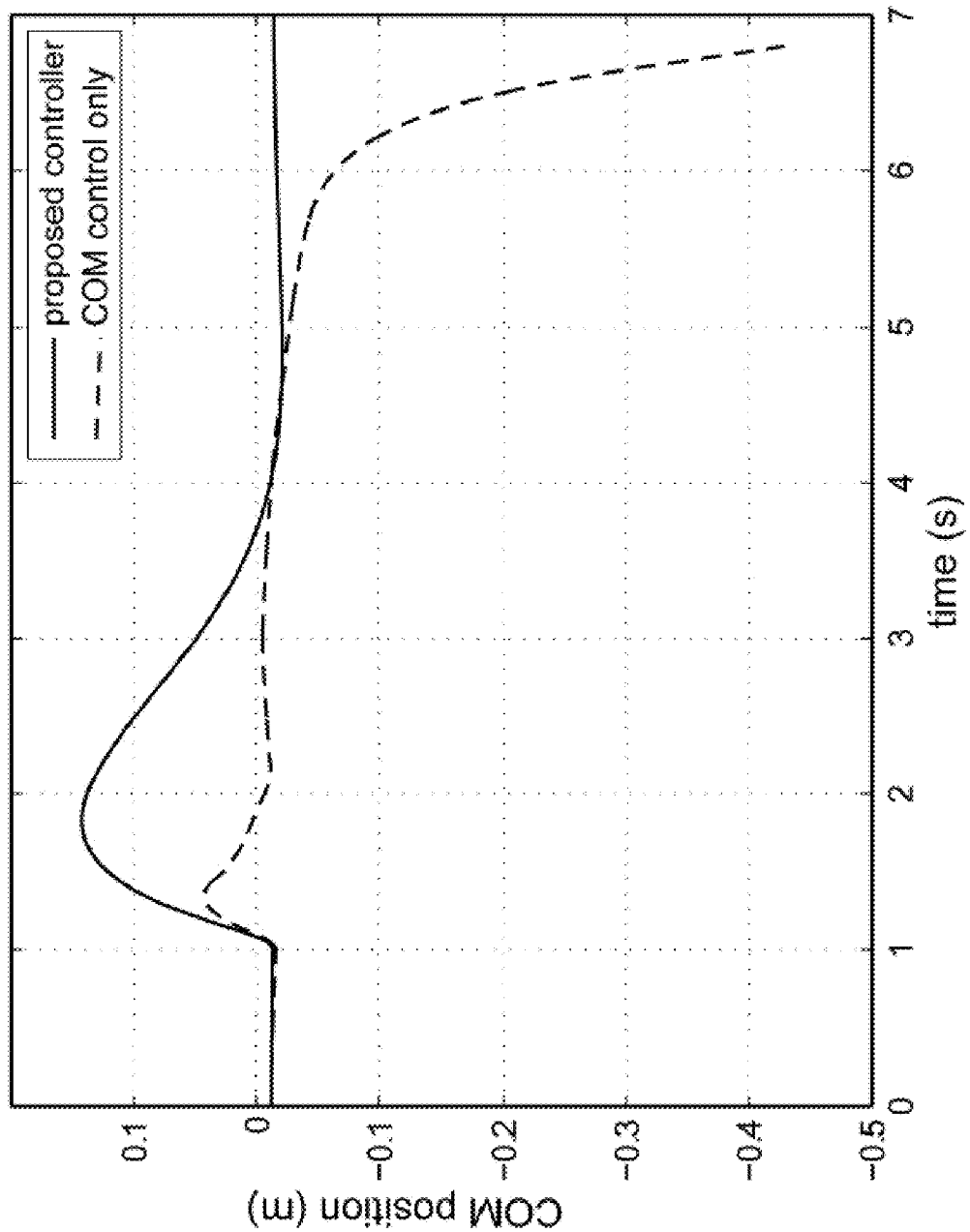
FIG. 5 illustrates center of gravity (COG) in the front direction during simple balancing with COM control only (dashed line) and with a controller according to an embodiment of the invention (solid line).
Figure 7:
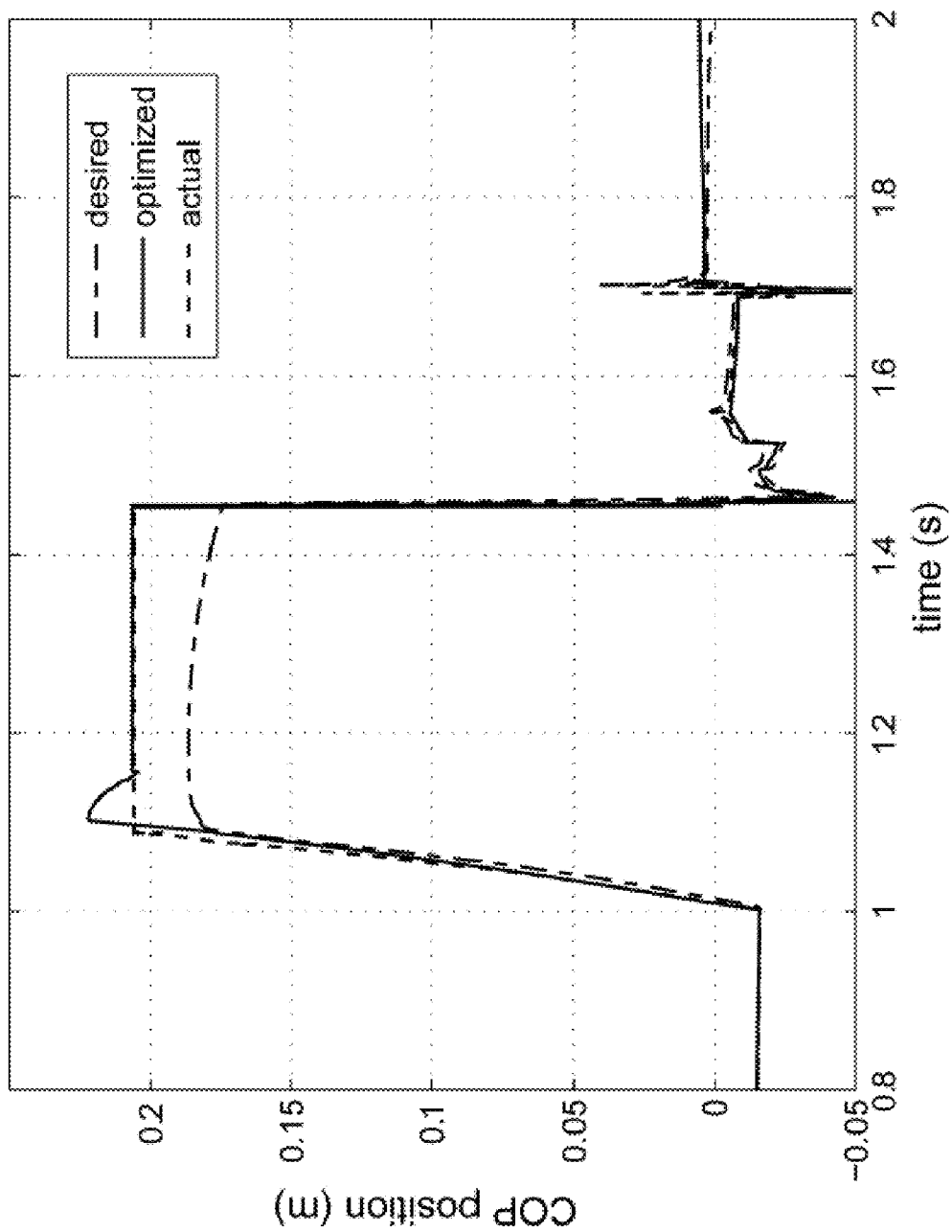
FIG. 7 illustrates COP position in the front direction during simple balancing with COM control only according to an embodiment of the invention.

The COP positions under the proposed controller and its COM control version are shown in FIGS. 6 and 7, respectively (note that a different time scale (2 seconds) is used compared to FIG. 5 to highlight an important part). In FIG. 6, the desired and optimized COP are almost identical, and the actual COP is also very close. In FIG. 7, again the desired, the optimized and the actual COP positions are illustrated. Here, where the desired COP was not considered, the actual COP also moved forward to give the COM negative acceleration, but the movement is so fast that it eventually had to use more control effort to bring the whole system to equilibrium.

Tracking Motion Capture Reference

To evaluate robot motion tracking capabilities of certain embodiments of the invention, a storytelling motion where joint tracking ability is important was utilized. Motion capture clips of two actors performing the nursery theme "I'm a little teapot" from CMU Motion Capture Data Library were randomly chosen as input. The controller was able to reproduce robot motion that preserves the styles of the original (subject) motions (not shown).

Disturbance Example: Error in Mass Parameters

Figure 11:
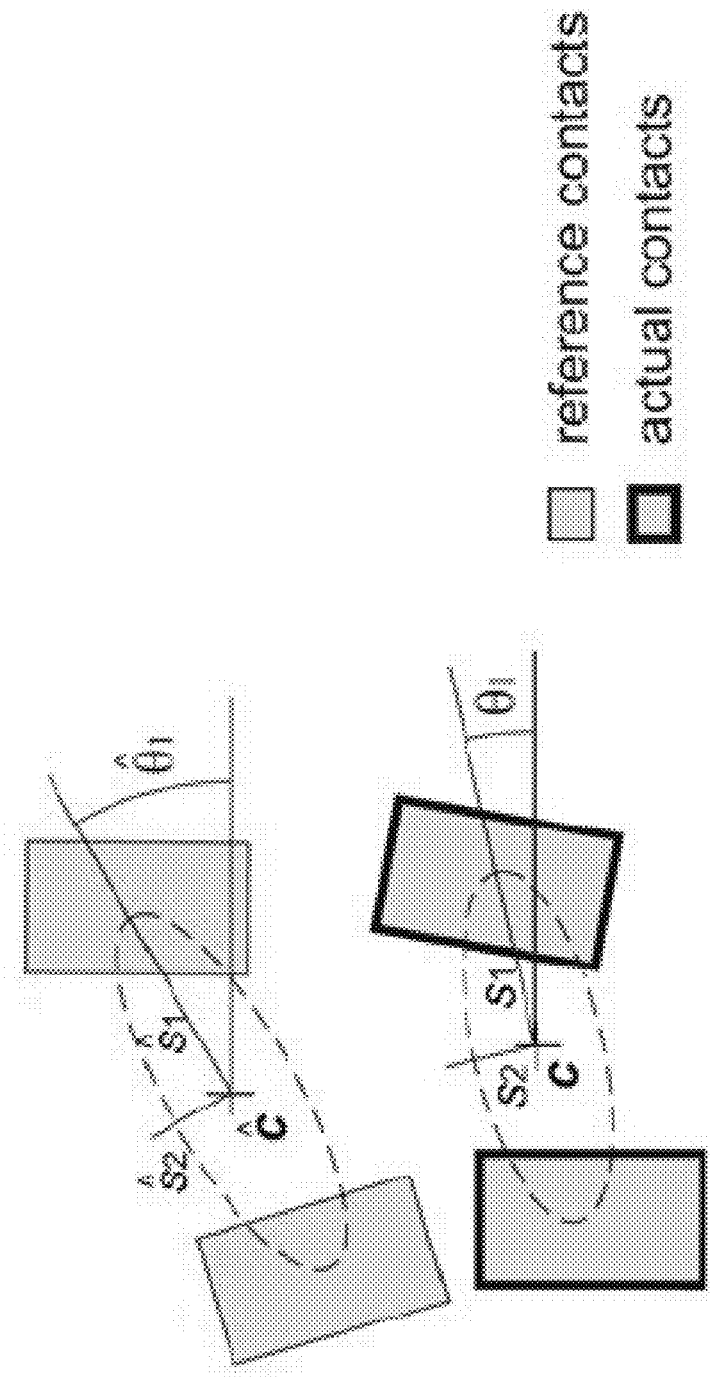
FIG. 11 illustrates parameters associated with translation, rotation and scaling of trunk position and orientation according to an embodiment of the invention.

The inertial parameters of a simulation model according to an embodiment of the invention were perturbed to emulate modeling errors due to using CAD models (that typically ignore small parts such as wires and, in a hydraulic robot, the significant mass of the oil in the cylinders and tubes). The mass and inertia of each link were increased in the simulation model by a random ratio between 5 and 15%. The reference model for control was kept the same. Because the estimated contact force is always smaller than the actual force, the robot cannot keep standing with the original gain ($k_p = 4.0$, $k_d = 4.0$). However, similar motion can be successfully generated by increasing the gains to keep $k_p = 16.0$, $k_d = 8.0$, as shown in FIG. 11.

Thus, embodiments of the invention provide a new framework for allowing floating-base humanoid robots to simultaneously keep balance and track motion capture data. The controller 100 combines a balance controller 101 designed for a simplified dynamics model of the robot 103 and a tracking controller 102 for individual joints. The optimizer 402c obtains the joint torques that respect the outputs of both balance 101 and tracking 102 controllers so that the robot 103 can maintain balance while tracking the reference joint trajectory.

As described in connection with the evaluations/simulations, the balance controller 101 can deal with various types of disturbances, including differences between simplified and full-body dynamics, inertial parameter errors, joint motions unknown to the balance controller 101, and external forces. In general, the inverted pendulum model and simple COM feedback control result in qualitatively similar COP positions. However, it can be difficult to determine optimal feedback gains, and a wrong gain choice would result in undesirable behaviors. Thus, a state-feedback controller can be designed for the inverted pendulum model.

It should be additionally noted that motion capture data is prone to error due to the inevitable mismatch between the subject and humanoid model, and, usually requires pre-processing to make sure that desired contact state is met throughout the motion. In contrast, the controller 100 according to embodiments of the invention requires little pre-processing (because of the small feedback gains allow the joints to adjust to minor misalignment of the feet). In addition, the pre-processing is simple enough to be done in real-time.

Control-Aware Mapping of Motion Data with Stepping for Robots

The description now turns to embodiments of the invention wherein a control-aware mapping of motion capture data (for example, human motion capture data) with stepping for robots is provided. Embodiments of the invention map motion capture data with stepping to a model, considering the current state and the controller behavior. A mapping process is described that modifies the joint angle, trunk and center of gravity (COG) trajectories so that the motion can be tracked and desired contact states can be achieved. The mapping is essentially performed in two steps.

The first step modifies the joint angle and trunk trajectories to adapt to the robot kinematics and actual contact foot positions. The second step uses a predicted center of pressure (COP) to determine if the balance controller can successfully maintain the robot's balance, and if not, modifies the COM trajectory. Unlike existing approaches for humanoid motion synthesis, the proposed mapping method is tightly connected with the robot controller. The approach was verified, as discussed herein, by simulation using a non-limiting example involving a captured tai-chi motion sequence that involves unstructured contact state changes.

Discussed below is an online motion mapping technique that considers the current robot and contact states as well as the behavior of the robot controller. More specifically, the foregoing description relating generally to simultaneous balancing and tracking is supplemented by adding functionality to adjust the joint angle, trunk and center of gravity (COG) trajectories so that the balance controller can successfully maintain balance while keeping the center of pressure (COP) inside the contact convex hull throughout the motion. It is demonstrated herein that the proposed method can successfully realize motions with unstructured contact state changes through full-body dynamics simulation.

Embodiments of the invention differ from existing work in humanoid control where motion synthesis and robot control are handled separately. In a controller framework according to embodiments of the invention, motion synthesis and control components are tightly connected by a mapping process that is aware of the current state and the underlying controller.

Figure 8:
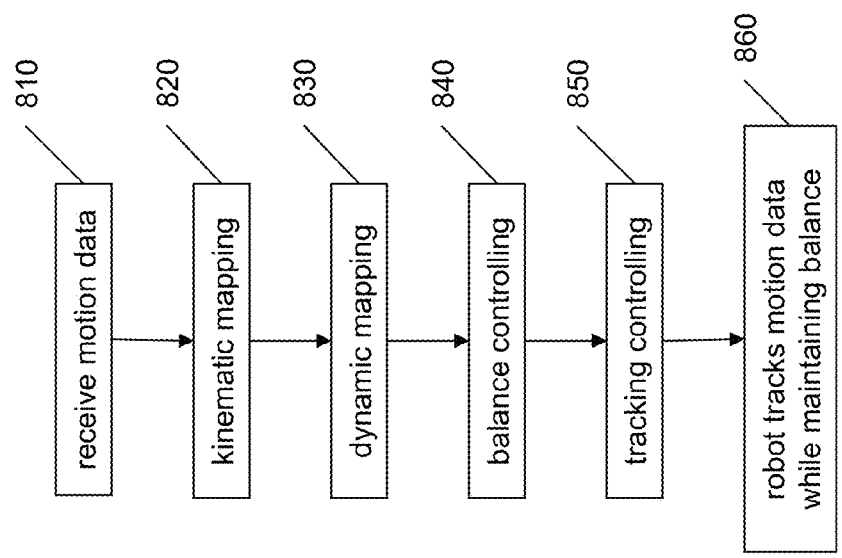
FIG. 8 illustrates tracking and balancing control according to an embodiment of the invention.

As illustrated in FIG. 8, tracking and balancing control according to an embodiment of the invention essentially involves receiving reference input, applying preprocessing (mapping), and thereafter utilizing balancing and tracking controllers to provide the appropriate torques to the robot joints such that the reference input can be tracked. For example, reference motion data from a motion capture system is received 810 and preprocessed. To preprocess the received motion data, kinematic mapping 820 and dynamic mapping 830 are applied, as discussed further herein. Thereafter, the preprocessed reference motion data is utilized, along with certain feedback inputs (for example, current contact positions), for balancing 840 and tracking 850 control, thus allowing the robot to move its joints to appropriately track the reference motion data while maintaining balance 860.

Figure 9:
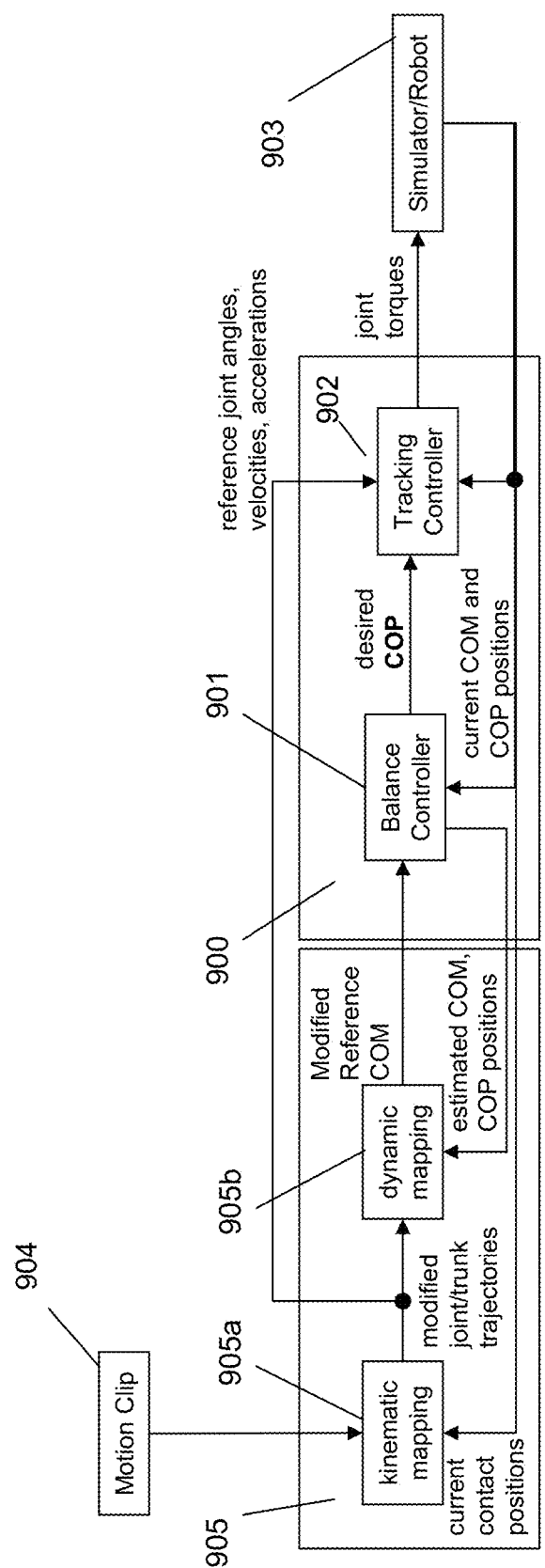
FIG. 9 illustrates a motion controller according to an embodiment of the invention.

Referring to FIG. 9, embodiments of the invention providing control aware mapping with stepping utilize a controller 900 similar to controller 100, described above (comprising a balancing controller 101 and a tracking controller 102). The main difference introduced by embodiments employing control aware mapping with stepping is the addition of a preprocessing component 905 that performs several types of adjustment to the reference motion (motion clip) 904 to realize a similar motion on the robot 903.

Figure 10:
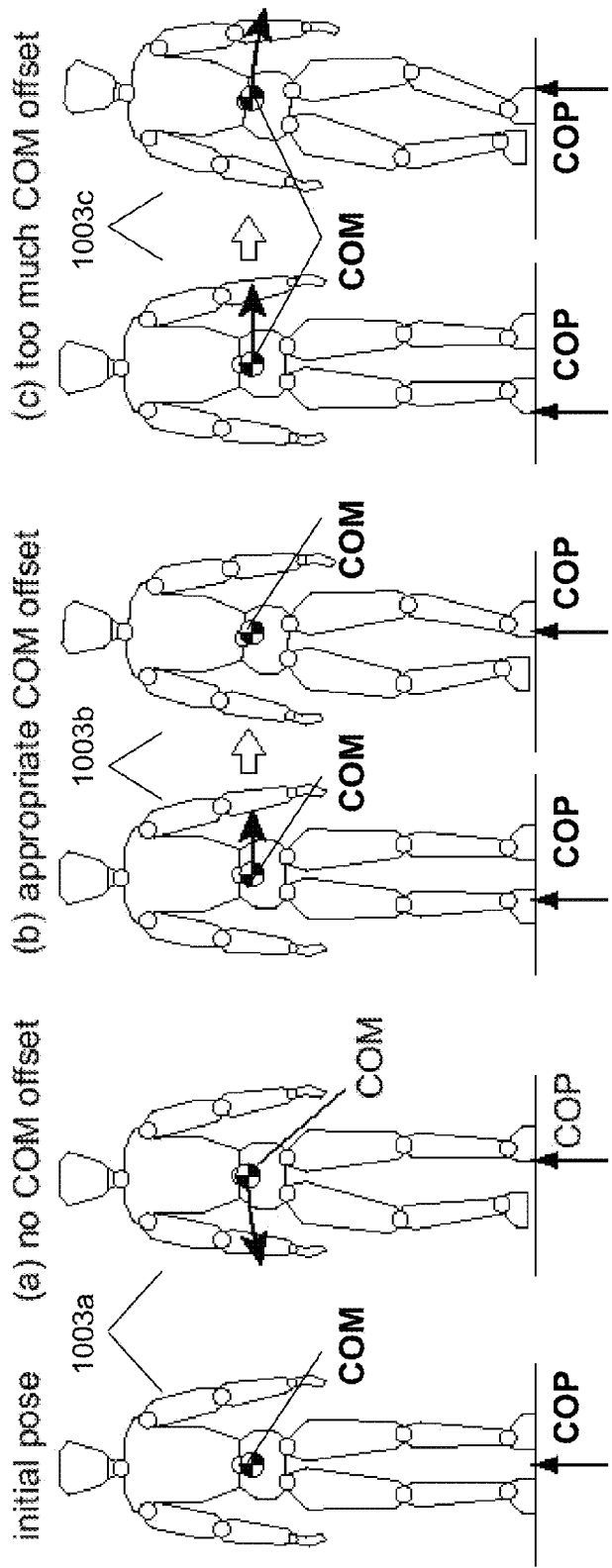
FIG. 10(a-c) illustrates an example of foot lifting: (a) no COM offset results in falling; (b) successful lifting requires the appropriate amount of COM offset; (c) too much offset also results in falling after lifting the foot.

FIG. 10(a-c) illustrates a motivating example for embodiments of the invention employing control aware mapping with stepping. Suppose that the robot 1003(a-c) is trying to lift one of its feet starting from the initial pose shown in FIG. 10(a). Simply changing the leg joint angles will make the robot 1003a fall down as shown in FIG. 10(a) because the COM is still in the middle of the feet while the COP moves under the supporting leg.

In order to lift a foot successfully, the robot 1003(b) first has to shift the COM towards the supporting leg by moving the COP as shown in FIG. 10(b). However, the robot 1003c cannot maintain balance if the COM offset is too large to be handled by the balance controller, as shown in FIG. 10(c). This example implies two important observations: 1) a mapping process needs to start preparing for contact state changes before they actually happen, and 2) a mapping process needs to know the controller 900 capability in order to determine the appropriate amount of adjustments.

FIG. 9 shows a controller overview according to an embodiment of the invention. The controller 100 presented in FIG. 1 took an unmodified motion sequence as reference. In the controller framework shown in FIG. 9, the motion clip 904 is first processed by the two mapping components 905(a-b) to ensure that the robot 903 can maintain balance with the balance controller 901 using the current measurements of the COM and COP positions. The mapping dynamic mapping component 905b also has a copy of the balance controller 901 to predict the behavior of the balance controller 901.

The pre-processing (mapping) component 905 includes kinematic 905a and dynamic 905b components. The kinematic mapping component 905a uses the current contact locations to modify the original joint angle and trunk trajectories so that the kinematic relationship between the contact area and robot 903 becomes similar to the reference motion (as derived from, for example, the motion clip 904). The dynamic mapping component 905b modifies the reference COM trajectory given to the balance controller 901 in case the future COP position predicted by the simplified robot model leaves the contact convex hull.

Herein the following assumptions about the original reference motion 904 are made: 1) Both feet of the (reference) subject are in flat contact with the floor at the initial frame. Any contact state is allowed at other frames. 2) The subject only makes physical interaction with a horizontal floor through the feet. 3) At least one of the feet is in contact with the floor at every frame. 4) The set of links in contact is known for each frame. The contacts do not have to be flat except for the initial frame, nor is detailed contact state information used (such as toe or heel contact).

Balance and Tracking Controllers

The balance 901 and tracking 902 controllers utilized for embodiments of the invention involving stepping are largely as discussed previously herein, however, these will be briefly reviewed and distinguished to take into account a mobile base (for example, as with stepping).

The balance controller 901 takes a reference COM position as input and calculates where the (desired) COP should be using an optimal controller designed for a simplified robot model. Herein, it is assumed that the optimal controller is designed for the 3-dimensional, 2-joint inverted pendulum with a mobile base, as shown in FIG. 3. In this model, the entire robot body is represented by a point mass located at the COM of the robot 903, and the position of the mobile base represents the COP.

Combining the optimal controller with an observer to estimate the current state, the whole balance controller 901 is described by equation (11), where $\hat{x}$ is the estimated state of the inverted pendulum, and $u_b$ is the input to the balance controller 901, which comprises the reference COM position and measured COM and COP positions. In the tracking controller 902, the mobile base position element of $\hat{x}$ is used as the desired COP position.

The tracking controller 902 first calculates the desired joint and trunk accelerations, $\ddot{q}$, using the same feedback and feedforward scheme as in the resolved acceleration control (equation (16)), where q is the current joint position, $q_{ref}$ is the reference joint position in the captured data, and $k_p$ and $k_d$ are constant position and velocity gains that may be different for each joint. The desired acceleration is also calculated for the six degrees of freedom (DOF) of the trunk and foot links using the same control scheme.

The tracking controller 902 then solves an optimization problem to obtain the joint torques that minimizes a cost function comprising the COP, joint acceleration and foot acceleration errors.

Kinematic Mapping

Kinematic mapping is accomplished according to an embodiment of the invention using a mapping module 905a, as described below. Kinematic mapping essential includes joint angle mapping (described above) and trunk trajectory mapping, which is described further below.

An adjustment is to globally transform the reference trunk position and orientation in the motion capture data to account for the difference in the reference and actual contact positions. The feet may not land at the reference position due to control errors. In such cases, using the same reference position for the trunk may result in falling due to the difference in its position relative to the contact area.

Accordingly, an embodiment of the invention applies translation, rotation and scaling to the trunk trajectory every time a new contact is established. FIG. 11 summarizes the parameters used to determine each transformation. Calculated first are the center of reference and actual contact convex hulls (by simply taking the average of all contact points):

$$\hat{c} = \frac{1}{M} \sum \hat{p}_i \quad (30)$$

$$c = \frac{1}{M} \sum p_i \quad (31)$$

where $\hat{c}$ and c are the center of contact convex hull in reference and actual motions respectively, M is the number of contact points, $\hat{p}_i$ and $p_i$ are the positions of the i-th contact point in reference and actual motions.

A principal component analysis of the contact point positions with respect to their center is then performed. Let $\hat{\theta}_1$ and $\theta_1$ denote the angle of the first principal component axis with respect to the x axis of the inertial frame. Also let $\hat{s}_i$ and $s_i$ (i=1, 2) denote the singular values of the reference and actual contact points.

For a pair of reference trunk position $\hat{p}$ and orientation $\hat{R}$, the transformed position p and orientation R are obtained as follows:

$$p = \Omega S(\hat{p} - \hat{c}) + c \quad (32)$$

$$R = \Omega \hat{R} \quad (33)$$

where $$S = \begin{pmatrix} s_1/\hat{s}_1 & 0 & 0 \\ 0 & s_2/\hat{s}_2 & 0 \\ 0 & 0 & 1 \end{pmatrix} \quad (34)$$

and $\Omega$ is the rotation matrix representing the rotation of $\theta_1 - \hat{\theta}_1$ around the vertical axis.

Note that the transformation is updated only when a contact is established. It would provide positive feedback if the transformation was updated when it is still possible to move the foot in contact, because the tracking controller 902 would move the contact position in the same direction as the transformation update. Therefore, the transformation is preferably updated only when the vertical contact force at every link in contact exceeds a large threshold after the contact state has changed in the reference motion.

Dynamic Mapping

An embodiment of the invention modifies the COM trajectory of the reference motion so that the balance controller 901 can keep the robot 903 balanced with the provided contact area. The mapping process predicts the future COP positions based on the current robot state and original reference COM trajectory. If the COP is leaving the contact convex hull, it calculates a new COM trajectory so that the COP stays within the contact convex hull and sends the next COM position to the balance controller 901 as the reference COM.

Figure 12:
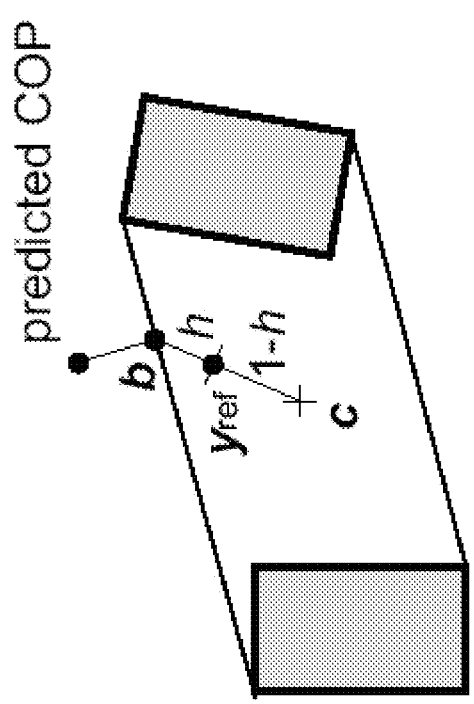
FIG. 12 illustrates obtaining a modified position according to an embodiment of the invention.

Referring to FIG. 12 generally, obtaining a modified COP position is now described. A discretized state equation model of the balance controller 901 is obtained based on the same optimal controller as in equation (11):

$$x_{k+1} = Ax_k + Bu_k \quad (35)$$

where $x_k$ is the state and $u_k$ is the input at sampling time k. In contrast to the balance controller 201 (11), the controller model (35) does not include an observer because real measurements are not being used here. Therefore, $u_k$ only includes the COM trajectory in the reference motion. The COP position is chosen as the output and the output equation is defined accordingly as:

$$y_k = Cx_k. \quad (36)$$

For a given initial state $x_0$ and the COM trajectory for the next n frames, $\hat{u}_k$ (k=0, 1, ..., n−1), the location of the COP n frames later can be predicted by:

$$\hat{y}_n = C(A^n x_0 + M_n \hat{U}_n) \quad (37)$$

where $$M_n = (A^{n-1}B \quad A^{n-2}B \quad \ldots \quad B) \quad (38)$$

$$\hat{U}_n = \begin{pmatrix} \hat{u}_0 \\ \hat{u}_1 \\ \vdots \\ \hat{u}_{n-1} \end{pmatrix}. \quad (39)$$

Then, a check if $\hat{y}_n$ is inside the contact convex hull at that particular frame is made using the reference joint angles. Practically, a maximum value N is chosen for n and that value is used to specify the maximum lookahead.

If it is found that $\hat{y}_n$ will leave the contact convex hull at frame n, the reference COM trajectory is modified to U' such that $y_n$ stays within the contact convex hull. One way to obtain U' is to solve the following optimization problem:

$$U' = \underset{U}{\arg\min} Z \quad (40)$$

where the cost function is:

$$Z = \frac{1}{2}(y_n - y_{ref})^T(y_n - y_{ref}) + \frac{1}{2}(U - \hat{U}_n)^T W(U - \hat{U}_n), \quad (41)$$

$y_{ref}$ is the desired COP inside the contact convex hull, W is a constant positive-definite weight matrix, and:

$$y_n = C(A^n x_0 + M_n U). \quad (42)$$

The first term tries to bring the COP as close as possible to a chosen point $y_{ref}$ while the second term penalizes the deviation from the original COM trajectory. The choice of $y_{ref}$ and W is discussed in the following paragraphs.

In principle, $y_{ref}$ can be any point inside the contact convex hull. Practically, however, a couple of issues are considered in order to determine $y_{ref}$. First, it would be better to keep a safety margin from the boundary because the resulting COP may not exactly be at $y_{ref}$. Also, the COM trajectory change should be minimized and the original reference motion maintained as much as possible. To consider both issues, first the closest point on the contact convex hull boundary is obtained from the predicted COP, b. Also, the center of the contact convex hull, c, is calculated. Then, $y_{ref}$ is obtained by:

$$y_{ref} = hb + (1-h)c \quad (43)$$

where $h = h_{max}(N-n)/N$, and $h_{max}$ is a user-specified constant. By this interpolation between b and c, $y_{ref}$ becomes closer to c as n becomes larger, which is based on the observation that it is more difficult to change the COM in a shorter period.

W represents how much the COM trajectory is allowed to deviate from the original. Because it is desirable to return to the original COM position at the last frame, it seems reasonable to give smaller values to the earlier frames and larger values to the later frames. According to one embodiment of the invention, the i-th diagonal component of W is calculated by $wi^2$ where w is a user specified constant.

Simulation Results

The effectiveness of a controller 900 according to an embodiment of the invention was verified with a simulator based on a rigid-body contact model and a forward dynamics process. The model of the humanoid robot described above was again utilized for the simulations described below.

The same linear quadratic regulator described in connection with balance controller 101, with the same parameters, was used. The feedback gains for the tracking controller were $k_p = 25$ and $k_d = 10$. The parameters for the adjustment components were $N=100$, $h_{max}=0.8$, and $w=0.001$. The control system (35) was discretized at the sampling time of 5 ms, meaning that the dynamic mapping component looked 0.5 s future in order to determine if COM modification was required. Note that the sampling time for discretization does not necessarily have to be the same as the control cycle. In fact, using larger sampling time for equation (35) than the control cycle can reduce the computation time for dynamic mapping.

Dynamic Mapping Example

Figure 13:
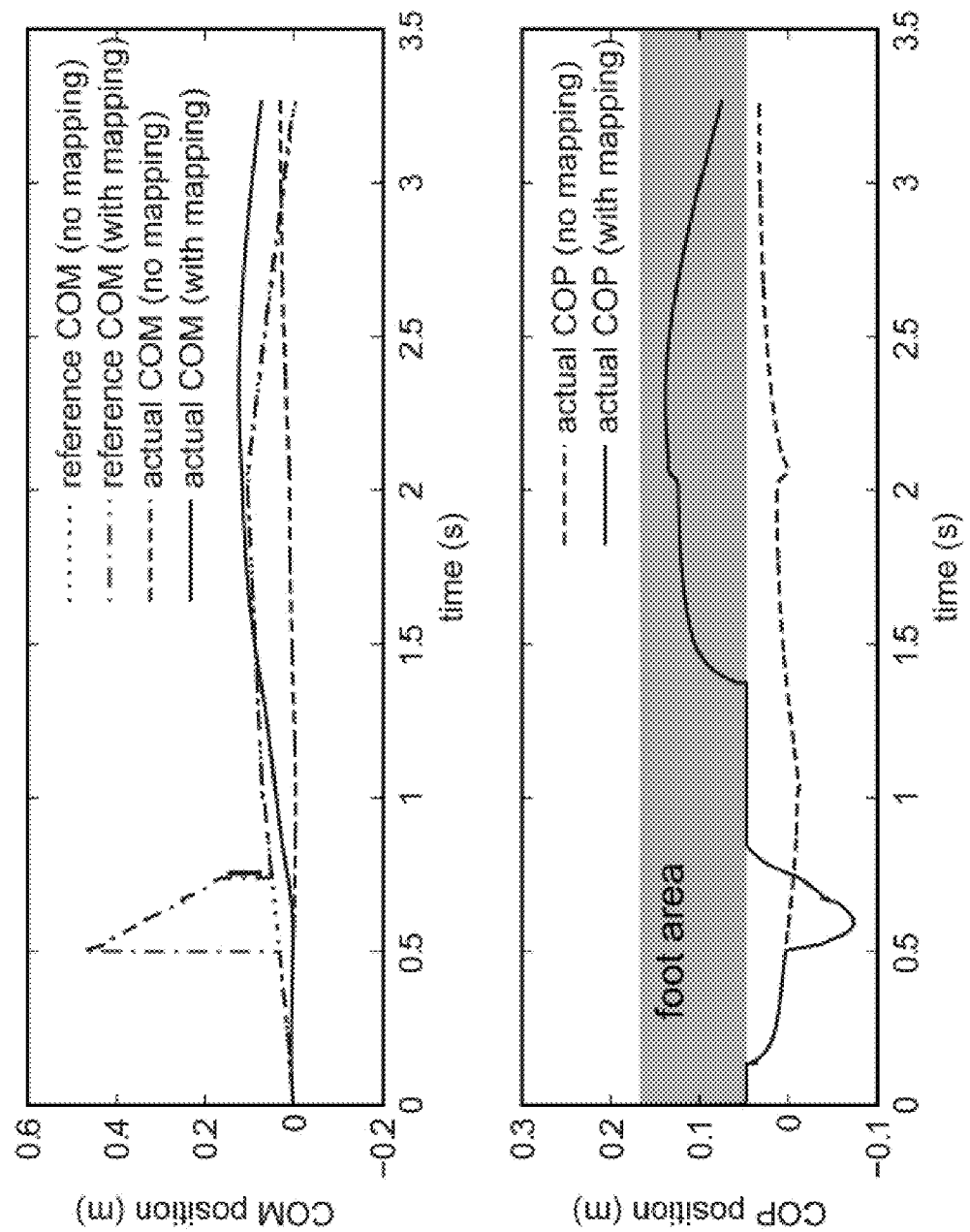
FIG. 13 illustrates COM and COP trajectories for right foot lifting according to an embodiment of the invention.

First is described a simple example where the dynamic mapping is required to realize a stepping motion. The reference is a manually generated simple motion where the right foot is lifted during the period between t=1.0 and 2.0 s while the left foot is in flat contact with the floor all the time. FIG. 13 illustrates in the top graph the reference COM (no mapping), the reference COM (with mapping), the actual COM (no mapping), and the actual COM (with mapping) trajectories for the simple right foot lifting example. The bottom graph shows the actual COP (no mapping) and the actual COP (with mapping) trajectories along the side of the robot, the positive axis pointing to its left. The foot area in the bottom graph depicts the contact area of the left foot. The bottom graph shows that the COP never reaches the left foot without dynamic mapping, and therefore the robot cannot lift its right foot (without dynamic mapping). If the mapping is turned on, on the other hand, the reference COM is modified at t=0.5 s when the lifting time comes into the COP prediction window and the dynamic mapping component 905b realizes that the COP will not be under the left foot in time. The COP shifts towards the right foot first in response to the new reference COM, which pushes the COM farther towards the left foot. The COP eventually reaches the left foot at around t=0.8 s, so the robot is able to lift the right foot.

Application to a Complex Motion

To ensure complex motions were adequately handled by embodiments of the invention, a motion capture sequence of tai chi from the CMU Motion Capture Data Library was employed, described below as a non-limiting example. The marker position data were converted to joint angle data by an inverse kinematics process with joint motion range constraints. Tai chi motion was chosen as an example because it involves many unstructured contact state changes, such as transition to toe or heel contact and slight repositioning of a foot while in contact. Simulated motions faithfully replicated the motion capture data for the complex tai chi motion.

Thus, an embodiment of the invention also provides a method for mapping human motion capture data to humanoid robots, including complex motions such as stepping. A notable feature is that not only are the different kinematics and dynamics of the robot correctly dealt with, but embodiments of the invention also correctly determine the amount of adjustments based on the current robot and contact states as well as the capability of the balance controller. For example, in the simulations, it was demonstrated that the proposed method could successfully make a humanoid robot imitate a human tai-chi motion.

Those having ordinary skill in the art will readily understand that embodiments of the invention may be implemented using one or more computer systems. In this regard, a non-limiting and exemplary computer system is described herein.

Figure 14:
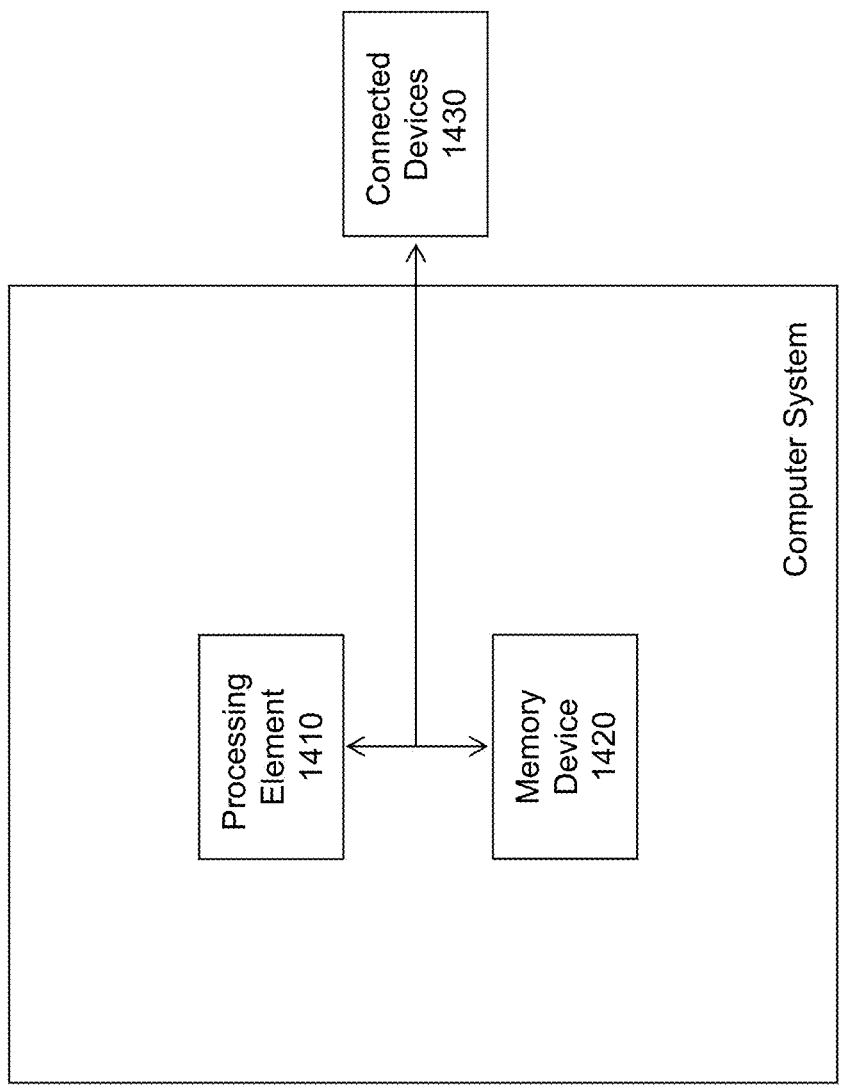
FIG. 14 illustrates a computer system according to an embodiment of the invention.

As shown in FIG. 14, aspects of the invention may be carried out in a computer system, such as user workstations, personal computers, or other client devices. In FIG. 14, an exemplary computer system can include a processing element 1410, such as a processor, controller or the like, and an associated memory device 1420, both of which are commonly included in computer systems. Moreover, it will be understood that the computer system may be connected to various connected devices 1430, such as for example components of a mechanical artificial agent such as a humanoid robot (in the context of an on-board computer system incorporated into a humanoid robot) such as sensors (encoder, potentiometer, load cell, gyro, accelerometer, and the like), other computer systems, et cetera.

In this regard, various aspects of the invention described can be performed by the processing element 1410 executing computer program instructions (including computer program code) stored by and accessible from, for example, the memory device 1420. Thus, it will be understood that certain operations described herein can be implemented by executing computer program instructions that are tangibly stored on a computer readable program storage device, such as memory device 1420, such that a computer system can be directed to function in a particular manner.

Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer system, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer system, other programmable data processing apparatus, or other devices to cause a series of operational steps to be performed on the computer system, other programmable apparatus or other devices to produce a computer implemented process such that the instructions which execute on the computer system or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A mechanical artificial agent comprising:
   a plurality of moving parts being joined via a plurality of joints, the plurality of moving parts including upper and lower moving body parts; and
   a controller configured to control motion of the plurality of moving parts, the controller comprising:
      a balance controller configured to provide a balancing control signal; and
      a tracking controller configured to generate motion commands, the motion commands being configured to track input reference motion while maintaining balance in accordance with the balancing control signal;
   wherein each one of the plurality of joints is capable of utilizing the motion commands and contributing to tracking the reference motion and maintaining balance.

2. The mechanical artificial agent according to claim 1, wherein the motion commands comprise joint torques.

3. The mechanical artificial agent according to claim 1, wherein the mechanical artificial agent is a humanoid robot.

4. The mechanical artificial agent according to claim 3, wherein the plurality of moving parts comprises a body portion of the humanoid robot having one or more moving lower body parts, and further wherein the balancing control signal is consistent with a whole body balancing model.

5. The mechanical artificial agent according to claim 1, wherein the reference motion further comprises one or more data inputs derived from a motion capture system.

6. The mechanical artificial agent according to claim 5, wherein the reference motion further comprises one or more stepping motions.

7. The mechanical artificial agent according to claim 4, wherein the controller further comprises:
   a kinematic mapping module; and
   a dynamic mapping module.

8. The mechanical artificial agent according to claim 7, wherein the kinematic mapping module is configured to use one or more current contact locations of the mechanical artificial agent to modify one or more of a trunk trajectory and one or more joint trajectories such that a kinematic relationship between one or more contact locations and the body of the mechanical artificial agent tracks the reference motion.

9. The mechanical artificial agent according to claim 7, wherein the dynamic mapping module is configured to modifying a reference center of gravity trajectory of the mechanical artificial agent to maintain a center of pressure inside a contact convex hull of the of the mechanical artificial agent while tracking the reference motion.

10. A method comprising:
receiving input data corresponding to reference motion;
providing a balancing control signal to a tracking controller of a mechanical artificial agent having a plurality of moving parts joined via a plurality of joints, the plurality of moving parts including upper and lower moving body parts;
providing a tracking control signal via the tracking controller, the tracking control signal comprising motion commands configured to track reference motion while maintaining balance in accordance with the balancing control signal;
wherein each one of the plurality of joints is capable of utilizing the motion commands and contributing to tracking the reference motion and maintaining balance.

11. The method according to claim 10, wherein the motion commands comprise joint torques.

12. The method according to claim 10, wherein the mechanical artificial agent is a humanoid robot.

13. The method according to claim 12, wherein the humanoid robot comprises a body portion having one or more moving lower body parts, and further wherein the balancing control signal is consistent with a whole body balancing model.

14. The method according to claim 10, wherein the reference motion further comprises one or more data inputs derived from a motion capture system.

15. The method according to claim 14, wherein the reference motion further comprises one or more stepping motions.

16. The method according to claim 10, further comprising utilizing a kinematic mapping module and a dynamic mapping module to preprocess the input data corresponding to reference motion.

17. The method according to claim 16, further comprising using the kinematic mapping module to modify one or more of a trunk trajectory and one or more joint trajectories such that a kinematic relationship between one or more contact locations and the body of the mechanical artificial agent tracks the reference motion.

18. The method according to claim 16, further comprising using the dynamic mapping module to modifying a reference center of gravity trajectory of the mechanical artificial agent to maintain a center of pressure inside a contact convex hull of the of the mechanical artificial agent while tracking the reference motion.

19. An apparatus comprising:
one or more processors; and
a program storage device having computer readable program code associated therewith configured to control motion of a mechanical artificial agent having a plurality of moving parts joined via a plurality of joints, the plurality of moving parts including upper and lower moving body parts, the computer readable program code being executable by the one or more processors and comprising:
computer readable program code configured to provide a balancing control signal; and
computer readable program code configured to generate motion commands, the motion commands being configured to track input reference motion while maintaining balance in accordance with the balancing control signal;
wherein each one of the plurality of joints is capable of utilizing the motion commands and contributing to tracking the reference motion and maintaining balance.

20. A computer program product comprising:
a program storage device having computer readable program code associated therewith configured to control motion of a mechanical artificial agent having a plurality of moving parts joined via a plurality of joints, the plurality of moving parts including upper and lower moving body parts, the computer readable program code being executable by one or more processors and comprising:
computer readable program code configured to provide a balancing control signal; and
computer readable program code configured to generate motion commands, the motion commands being configured to track input reference motion while maintaining balance in accordance with the balancing control signal;
wherein each one of the plurality of joints is capable of utilizing the motion commands and contributing to tracking the reference motion and maintaining balance.

* * * * *